(12) United States Patent
Reed et al.

(10) Patent No.: US 7,517,002 B2
(45) Date of Patent: Apr. 14, 2009

(54) POCKETED PANEL ASSEMBLY

(75) Inventors: Randy Reed, Fair Haven, MI (US); David James Dooley, Troy, MI (US); Richard David George, Rochester Hills, MI (US); Todd Leland DePue, Brighton, MI (US); Mark J. Heinze, Clarkston, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 231 days.

(21) Appl. No.: 11/422,611

(22) Filed: Jun. 7, 2006

(65) Prior Publication Data

US 2007/0284902 A1     Dec. 13, 2007

(51) Int. Cl.
*B60J 7/00* (2006.01)
*B29C 69/02* (2006.01)

(52) U.S. Cl. .............. 296/146.7; 296/37.13; 264/250; 264/255

(58) Field of Classification Search .............. 296/146.7, 296/37.13, 37.1, 37.5, 37.8, 37.12, 37.15; 224/544, 539; 264/250, 255
See application file for complete search history.

(56) References Cited

U.S. PATENT DOCUMENTS

| 5,073,318 | A | 12/1991 | Rohrlach et al. |
| 5,501,829 | A | 3/1996 | Nichols |
| 6,838,027 | B2 | 1/2005 | Brodi, Jr. et al. |
| 6,971,698 | B1 | 12/2005 | King |
| 2004/0222557 | A1 | 11/2004 | Parrish |
| 2005/0227043 | A1 | 10/2005 | Schoemann et al. |
| 2005/0238828 | A1 | 10/2005 | Youngs et al. |

*Primary Examiner*—Joseph D Pape

(57) ABSTRACT

A pocketed panel assembly for a vehicle door is disclosed herein. The pocketed panel assembly includes a trim panel, a partial pocket structure, and a living hinge. The trim panel has a pivotal edge, and the partial pocket structure also has a pivotal edge. The living hinge integrally joins the pivotal edge of the trim panel to the pivotal edge of the partial pocket structure. In such a configuration, the partial pocket structure can be rotated about the living hinge and substantially abutted against the trim panel so as to form an open pocket on the trim panel.

10 Claims, 6 Drawing Sheets

POCKETED PANEL ASSEMBLY

FIELD OF THE INVENTION

The present invention generally relates to the manufacture and assembly of automotive vehicles. The present invention more particularly relates to the manufacture and assembly of features included on the trim panels of vehicle doors.

BACKGROUND OF THE INVENTION

A door on an automotive vehicle conventionally includes an outer metal structure that is hinged to a doorframe on the vehicle. Typically, one or more stylized trim panels are mounted on the inboard side of the vehicle door's structure so as to face the interior of the vehicle's passenger cabin. In general, such trim panels serve to give the vehicle door an aesthetically attractive appearance when viewed by onboard passengers. At the same time, such trim panels also serve to cover up various internal mechanisms that are situated in the door's structure. Such internal mechanisms may include, for example, door-locking mechanisms, door-window mechanisms, door-window controllers, sideview-mirror controllers, and various electrical devices. Furthermore, in addition to covering internal door mechanisms, trim panels may also serve as structural support for various external features such as, for example, integral armrests, beverage holders, ashtrays, or even door courtesy lights.

In recent years, integral storage pockets have become increasingly popular features in the trim panels of vehicle doors. Such storage pockets can be utilized by vehicle passengers as convenient places for the onboard storage of various items such as, for example, road maps, vehicle-related papers, sunglasses, and other small articles. As a result of such use, such storage pockets are frequently referred to as "map pockets." In general, the opening of an integral map pocket is formed by a hole that is defined in a vehicle door's trim panel.

According to convention, a map pocket integral with a vehicle door's trim panel is most commonly formed in one of two particular ways. In the first way, a map pocket is created by initially forming a trim panel with a projected frontal region and opening defined therein and then fastening a separate panel to the back side (i.e., outboard side) of the trim panel. In this configuration, the resulting map pocket somewhat protrudes into a vehicle's passenger cabin. In contrast, in the second way, a map pocket is created by initially forming a substantially planar trim panel with an opening defined therethrough and then fastening the back side of the trim panel to the vehicle door's metal structure. In this configuration, the lower portion of the trim panel serves as a vertical front wall for the resulting map pocket's lower recesses. In this way, the map pocket is recessed within the vehicle door so that the pocket's inner hollow is generally located between the inboard trim panel and the outboard metal panel of the vehicle door. During assembly of a vehicle door, therefore, each of these two ways for creating an integral map pocket generally requires both a separate front portion and a separate back portion that, only when fastened and thereby fixed together, cooperatively form a map pocket in or on the vehicle door. As a consequence, each of these two conventional ways for creating a map pocket on a vehicle door undesirably requires multiple molding, alignment, and fastening steps during manufacturing.

In addition to integral map pockets on vehicle door trim panels, surfaces that are both aesthetically attractive and tactilely pleasing are becoming increasingly desirable on the inboard sides of vehicle doors as well. For example, including one or more sections of carpet on the inboard side of vehicle doors has become quite popular in recent years. In addition, applying layers of numerous soft fibers to the inboard surfaces of vehicle doors has also become popular. Unfortunately, however, including such sections of carpet or layers of fibers on the inboard sides of vehicle doors generally requires numerous additional assembly or manufacturing steps. In particular, in order to successfully include carpet on the inboard sides of vehicle doors, sections of carpet must first be precisely sized and cut before ultimately being installed and mounted in the doors. Furthermore, in order to include fibers on the inboard surfaces of vehicle doors, a labor-intensive manufacturing process commonly called "flocking" must generally be performed. During flocking, a special spraying technique is carried out that enables short cotton or synthetic fibers to adhere to the surfaces of a vehicle door's trim panel in dense piles of twisted fibers. To properly perform the spraying technique so that fibers adhere to door surfaces in a uniform and attractive manner, multiple separate masking, spraying, and sonic welding steps are often necessary, especially when attempting to cover uneven trim panel surfaces or the interior surfaces of map pockets.

In view of the above, there is a present need in the art for a map pocket assembly that is integrable with a trim panel on a vehicle door by means of a minimal number of manufacturing steps. Preferably, one or more sections of carpet, or layers of flocking fibers, can optionally be included on the assembly as well by means of a minimal number of additional manufacturing steps.

SUMMARY OF THE INVENTION

The present invention provides a pocketed panel assembly for a vehicle door. In one practicable embodiment, the pocketed panel assembly includes a trim panel, a partial pocket structure, and a living hinge. The trim panel has a pivotal edge, and the partial pocket structure also has a pivotal edge. The living hinge integrally joins the pivotal edge of the trim panel to the pivotal edge of the partial pocket structure. In such a configuration, the partial pocket structure can be rotated about the living hinge and substantially abutted against the trim panel so as to form an open pocket on the trim panel.

The present invention also provides a method of assembling a pocketed panel for a vehicle door. In one practicable methodology, the method first includes the step of performing an injection-molding process to create a pocketed panel assembly that includes (i) a trim panel having a pivotal edge, (ii) a partial pocket structure having a pivotal edge, and (iii) a living hinge integrally joining the pivotal edge of the trim panel to the pivotal edge of the partial pocket structure. Thereafter, the method also includes the step of rotating the partial pocket structure about the living hinge so as to substantially abut the partial pocket structure against the trim panel. Lastly, the method further includes the step of fixing the partial pocket structure onto the trim panel so as to form an open pocket on the trim panel.

Furthermore, it is believed that various alternative embodiments and methodologies of the present invention will become apparent to those skilled in the art when the detailed description of the best mode(s) contemplated for practicing the present invention, as set forth hereinbelow, is reviewed in conjunction with the appended claims and the accompanying drawing figures.

BRIEF DESCRIPTION OF THE DRAWINGS

The present invention is described hereinbelow, by way of example, with reference to the following drawing figures.

LIST OF PARTS AND FEATURES

To facilitate a proper understanding of the present invention, a list of parts and features highlighted with alphanumeric designations in FIGS. 1 through 5 is set forth hereinbelow.

10 pocketed panel assembly (for a vehicle door)
12 trim panel
14 designated front side (i.e., inboard side of trim panel)
16 designated back side (of trim panel)
18 designated top edge (of trim panel)
20 designated bottom edge (of trim panel)
22 designated left edge (of trim panel)
24 designated right edge (of trim panel)
26 top left slot (of fixing means)
28 bottom left slot (of fixing means)
30 top right slot (of fixing means)
32 bottom right slot (of fixing means)
34 pivotal edge (of trim panel)
36 partial pocket structure
38 designated front side (i.e., inboard side of partial pocket structure)
40 interior surface (of partial pocket structure)
42 designated top edge (of partial pocket structure)
44 designated bottom side (of partial pocket structure)
46 designated left side (of partial pocket structure)
48 designated right side (of partial pocket structure)
50 pivotal edge (of partial pocket structure)
52 top left tab (of fixing means)
54 bottom left tab (of fixing means)
56 top right tab (of fixing means)
58 bottom right tab (of fixing means)
60 living hinge (i.e., an integral hinge)
62 recess (on designated front side of partial pocket structure)
64 feature insert (including carpet)
66 hole (for receiving fastener)
68 arcuate path of rotation (of partial pocket structure about living hinge)
70 open pocket
72 fastener (for example, a bolt or screw)
74 vehicle door mount
76 method (of assembling a pocketed panel for a vehicle door)
78 first step (of method)
80 second step (of method)
82 third step (of method)

DETAILED DESCRIPTION OF THE INVENTION

Figure 1:
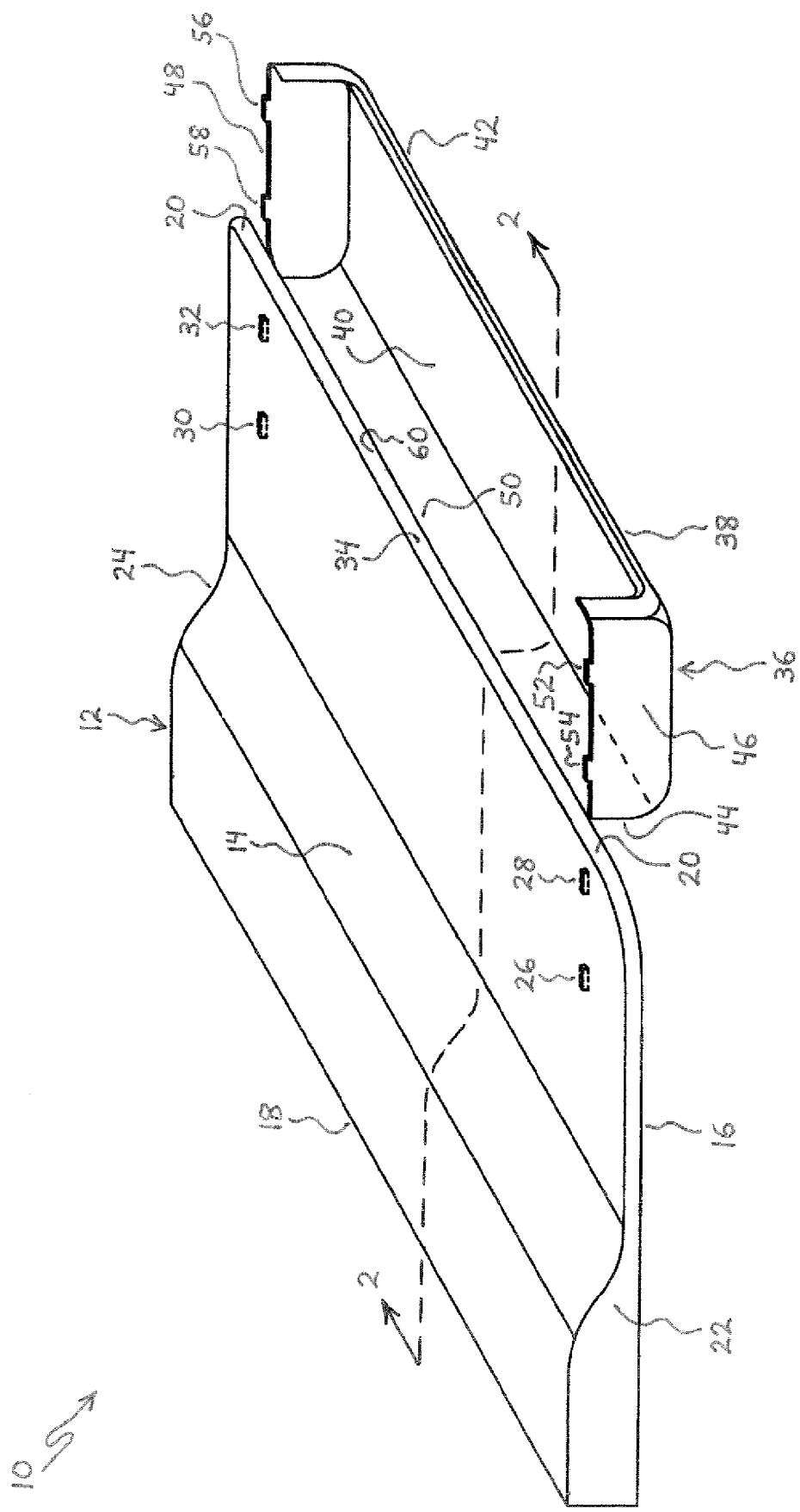
FIG. 1 illustrates a perspective view of a pocketed panel assembly for a vehicle door. In this view, the pocketed panel assembly is shown to include a trim panel, a partial pocket structure, and a living hinge integral therewith.

FIG. 1 illustrates a perspective view of one practicable embodiment of a pocketed panel assembly 10 for a vehicle door pursuant to the present invention. As shown in this view, the pocketed panel assembly 10 basically includes a trim panel 12, a partial pocket structure 36, and an integral or "living" hinge 60.

The trim panel 12, first of all, has a designated front (i.e., inboard) side 14, a designated back side 16, a designated top edge 18, a designated bottom edge 20, a designated left edge 22, and a designated right edge 24. The back side 16 of the trim panel 12 is structurally adapted for being mounted on a vehicle door. As further shown in FIG. 1, the trim panel 12 also has a pivotal edge 34 that is located at, on, or near its bottom edge 20.

The partial pocket structure 36, next of all, has a designated front (i.e., inboard) side 38, an interior surface 40, a designated top edge 42, a designated bottom side 44, a designated left side 46, and a designated right side 48. As further shown in FIG. 1, the partial pocket structure 36 also has a pivotal edge 50 that is located at, on, or near its bottom side 44.

The living hinge 60, last of all, integrally joins the pivotal edge 34 of the trim panel 12 to the pivotal edge 50 of the partial pocket structure 36. In this configuration, the trim panel 12, the partial pocket structure 36, and the living hinge 60 each comprise a plastic material such as, for example, polypropylene, a thermoplastic elastomer, a thermoplastic olefin (i.e., alkene), a thermoplastic polyolefin, acrylonitrile butadiene styreneplastic (ABS), or the like. In general, the trim panel 12, the partial pocket structure 36, and the living hinge 60 integral therewith are all formed in a common mold during a plastic injection-molding process.

Figure 2A:
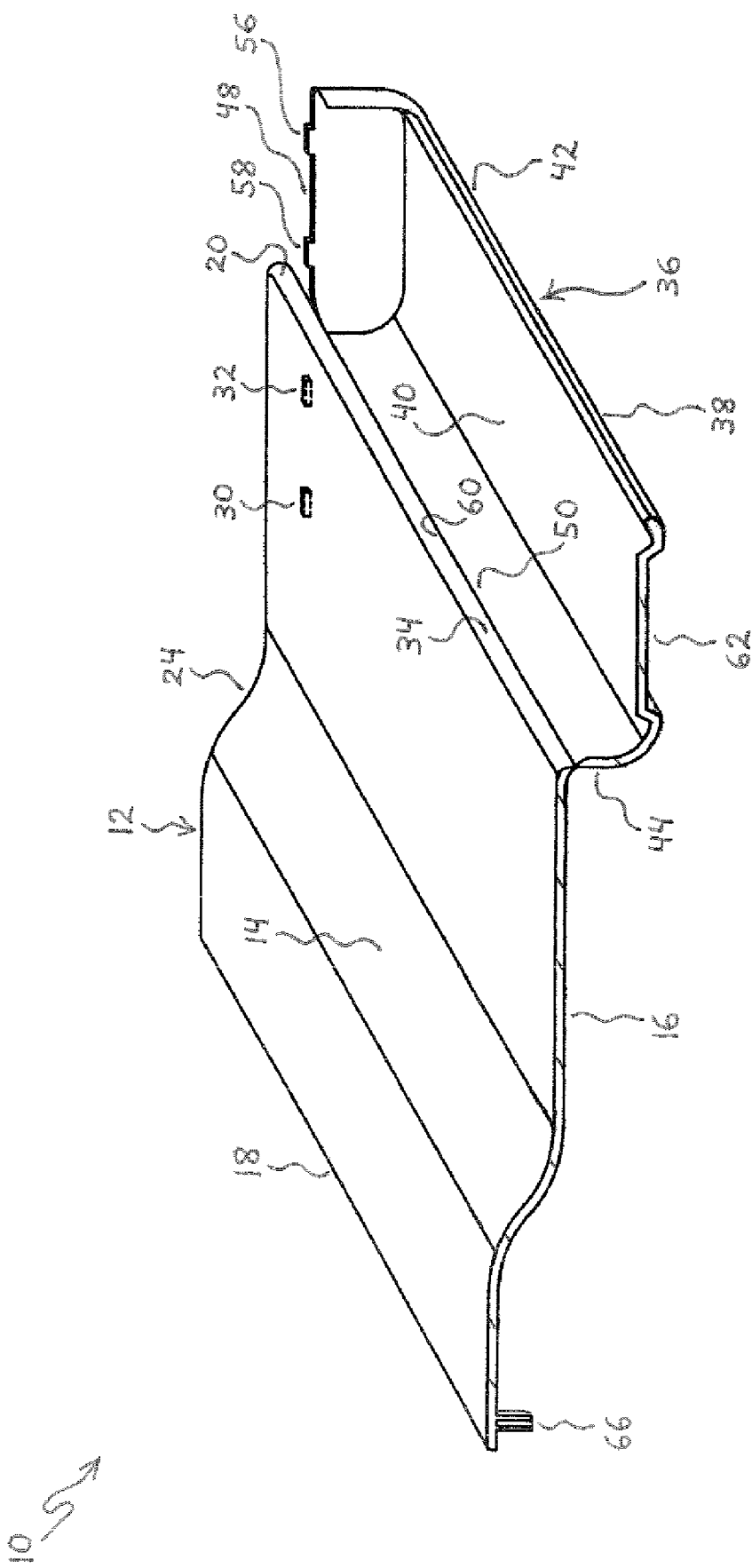
FIG. 2A illustrates a cut-away perspective view of the pocketed panel assembly depicted in FIG. 1. In this view, the designated front side of the partial pocket structure is shown to include a recess for accommodating an add-on feature.

FIG. 2A illustrates a cut-away perspective view of the pocketed panel assembly 10 depicted in FIG. 1. In this view, the front side 38 of the partial pocket structure 36 is shown to include a recess 62 for structurally accommodating an add-on feature. Such an add-on feature may include, for example, a section of carpet, a layer of flocking fibers, or a decorative panel.

Figure 2B:
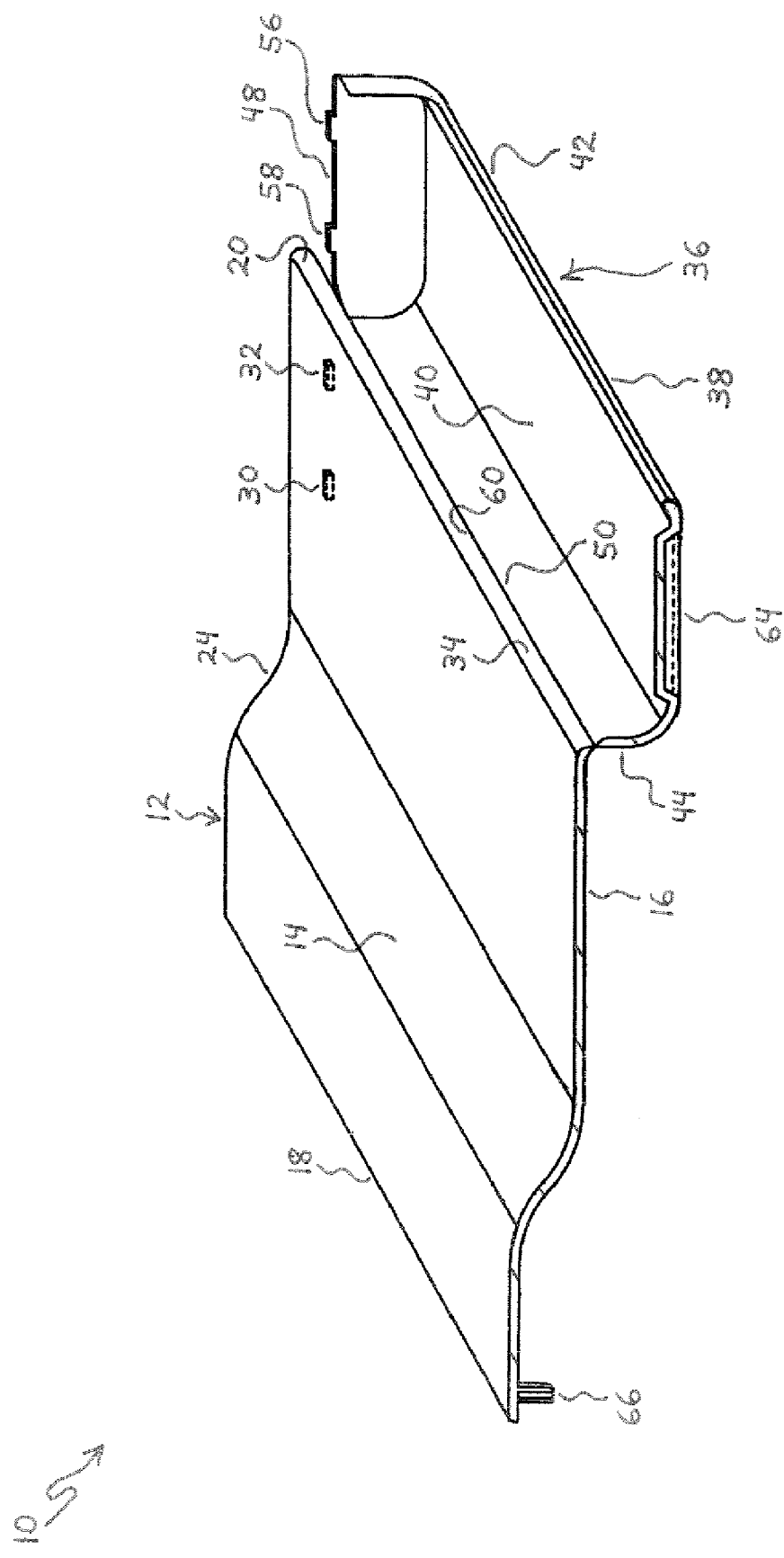
FIG. 2B illustrates another cut-away perspective view of the pocketed panel assembly depicted in FIG. 1. In this view, the designated front side of the partial pocket structure is alternatively shown to include a feature insert with, for example, carpet.

FIG. 2B illustrates another cut-away perspective view of the pocketed panel assembly 10 depicted in FIG. 1. In this view, the front side 38 of the partial pocket structure 36 is alternatively shown to include a feature insert 64 with, for example, a section of carpet. Such a feature insert 64 may be mounted and retained in or on the front side 38 of the partial pocket structure 36 by an insert-molding process.

Figure 3:
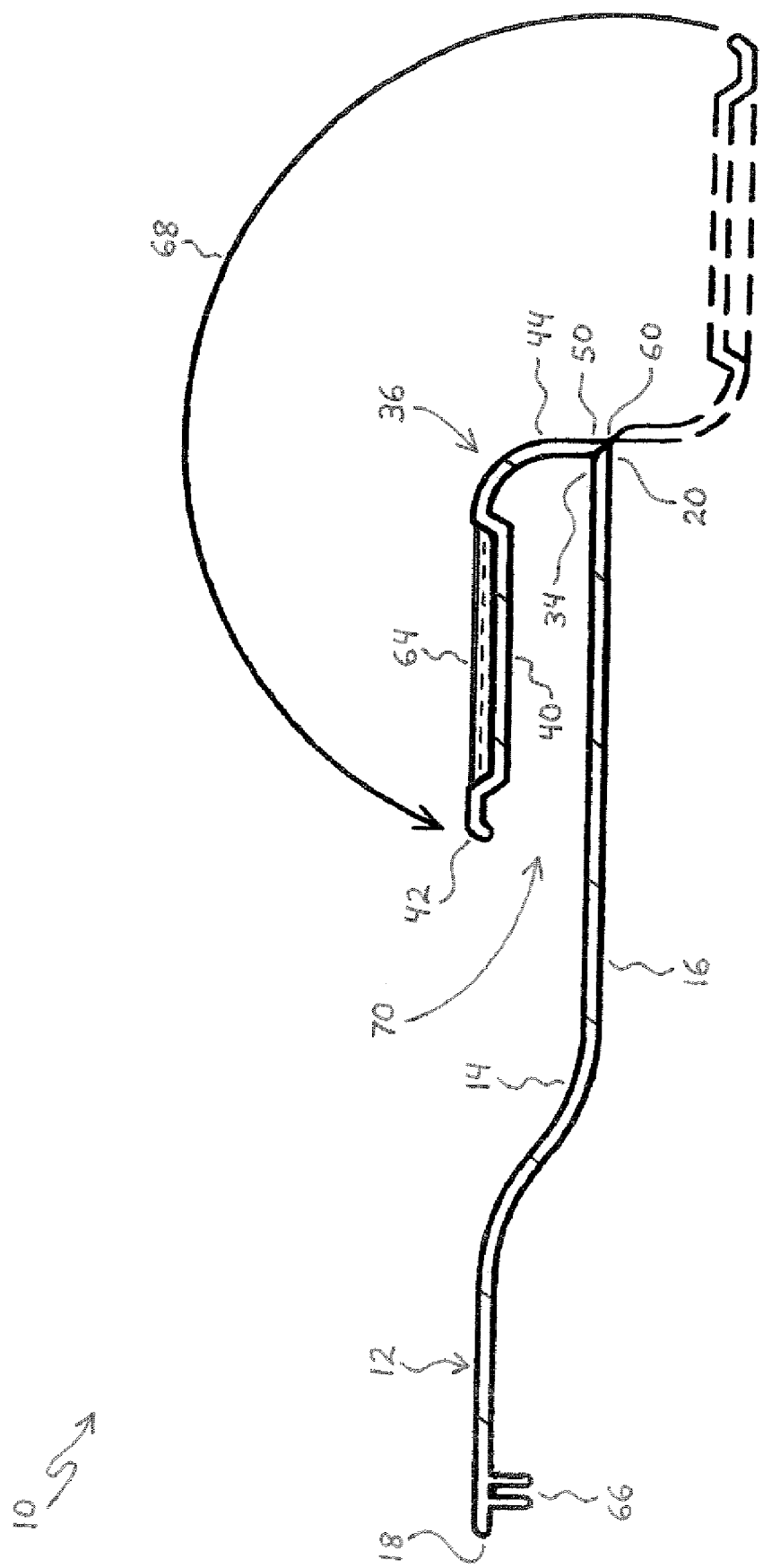
FIG. 3 illustrates a sectional view of the pocketed panel assembly depicted in FIGS. 1 and 2B. In this view, the partial pocket structure is shown being rotated about the living hinge and substantially abutted against the designated front side of the trim panel.

FIG. 3 illustrates a sectional view of the pocketed panel assembly 10 depicted in FIGS. 1 and 2B. In this view, the partial pocket structure 36 is shown being rotated (i.e., pivoted) about the living hinge 60 and substantially abutted against the front side 14 of the trim panel 12 for the purpose of assembly. As highlighted in FIG. 3, the top edge 42 of the partial pocket structure 36 generally moves along an arcuate path of rotation 68 as the pocket structure 36 is abutted against the trim panel 12 in this manner.

Figure 4:
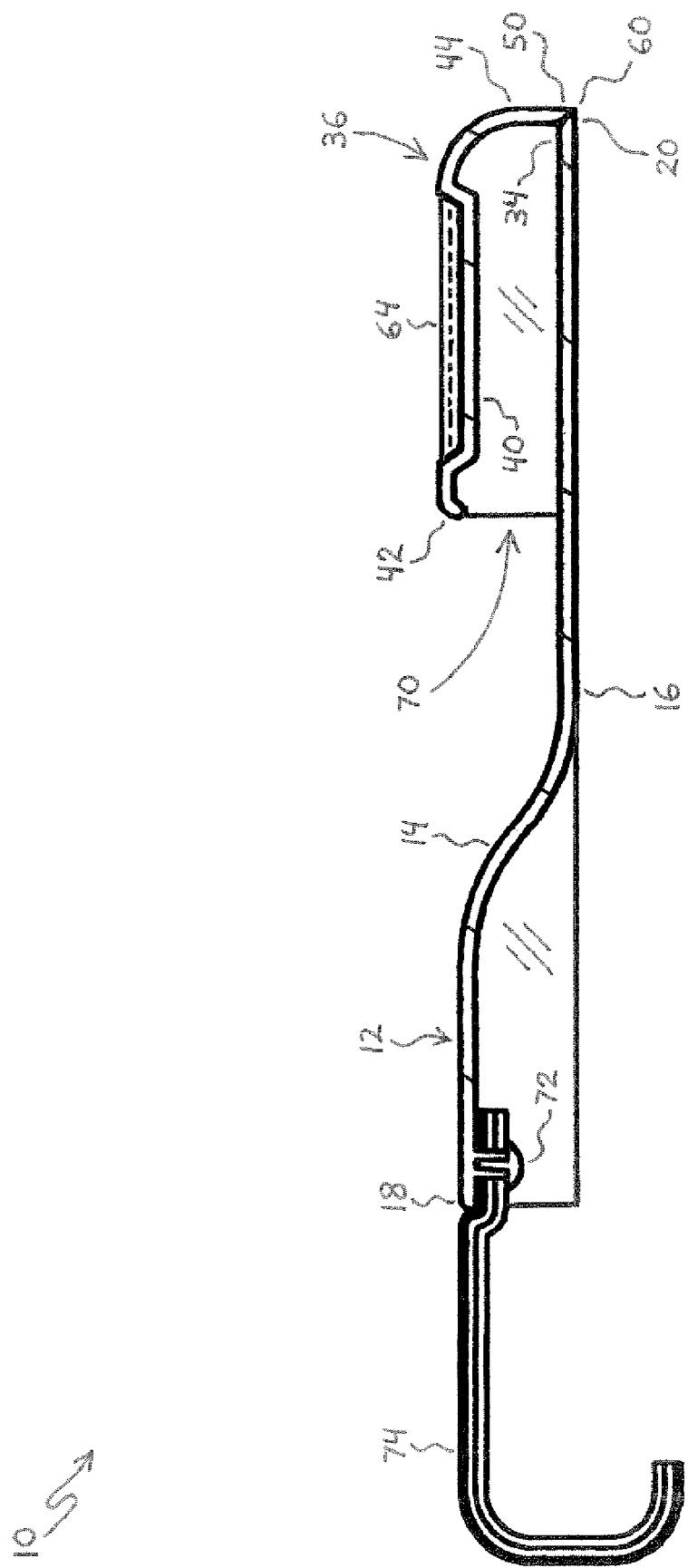
FIG. 4 illustrates a cut-away view of the pocketed panel assembly depicted in FIGS. 1, 2B, and 3. In this view, the partial pocket structure is shown fixed onto the designated front side of the trim panel, thereby forming an open pocket on the trim panel.

FIG. 4 illustrates a cut-away view of the pocketed panel assembly 10 depicted in FIGS. 1, 2B, and 3. In this view, the partial pocket structure 36 is shown fixed onto the front side 14 of the trim panel 12, thereby forming an open pocket 70 on the trim panel 12. To successfully fix the partial pocket structure 36 onto the trim panel 12 in this manner, the pocketed panel assembly 10 preferably further includes one or more fixing means.

As co-illustrated in FIGS. 1 and 4, one possible fixing means may include both a plurality of tabs 52, 54, 56, and 58 formed on the partial pocket structure 36 and a matching plurality of slots 26, 28, 30, and 32 defined in the front side 14 of the trim panel 12. In this configuration, the tabs 52, 54, 56, and 58 are particularly aligned and structurally adapted for being inserted and captured in the slots 26, 28, 30, and 32 when the partial pocket structure 36 is rotated about the living hinge 60 and abutted against the trim panel 12 during assembly, as shown in previously discussed FIG. 3. In addition to such a tabs-and-slots fixing means, a supplemental or alternative fixing means may include one or more sonic welds, heat stakes, and/or glue between the partial pocket structure 36 and the front side 14 of the trim panel 12.

As further shown in FIG. 4, once the partial pocket structure 36 is successfully abutted and fixed onto the trim panel 12, the pocketed panel assembly 10 as fully assembled may then be mounted onto a vehicle door mount 74. To facilitate mounting the pocketed panel assembly 10 onto the vehicle door mount 74, the back side 16 of the assembly's trim panel 12 includes at least one hole 66 for receiving a fastener 72, such as a bolt, a screw, or the like.

In other possible embodiments of a pocketed panel assembly pursuant to the present invention, it is to be understood that the living hinge may alternatively be a composite living hinge that particularly comprises a plurality of complementary living hinges. Such complementary living hinges may or may not be directly connected to each other and may also be aligned or arranged in various different ways. Furthermore, in these other embodiments, the partial pocket structure may alternatively be a composite structure (i.e., a split or sectioned structure) that particularly comprises a plurality of complementary partial pocket structures. In such embodiments, each complementary partial pocket structure may either be integrally fixed onto the trim panel or integrally hinged to the trim panel. In this way, one or more partial pocket structures can be rotated about one or more living hinges so as to cooperatively form an open pocket on the trim panel.

Figure 5:
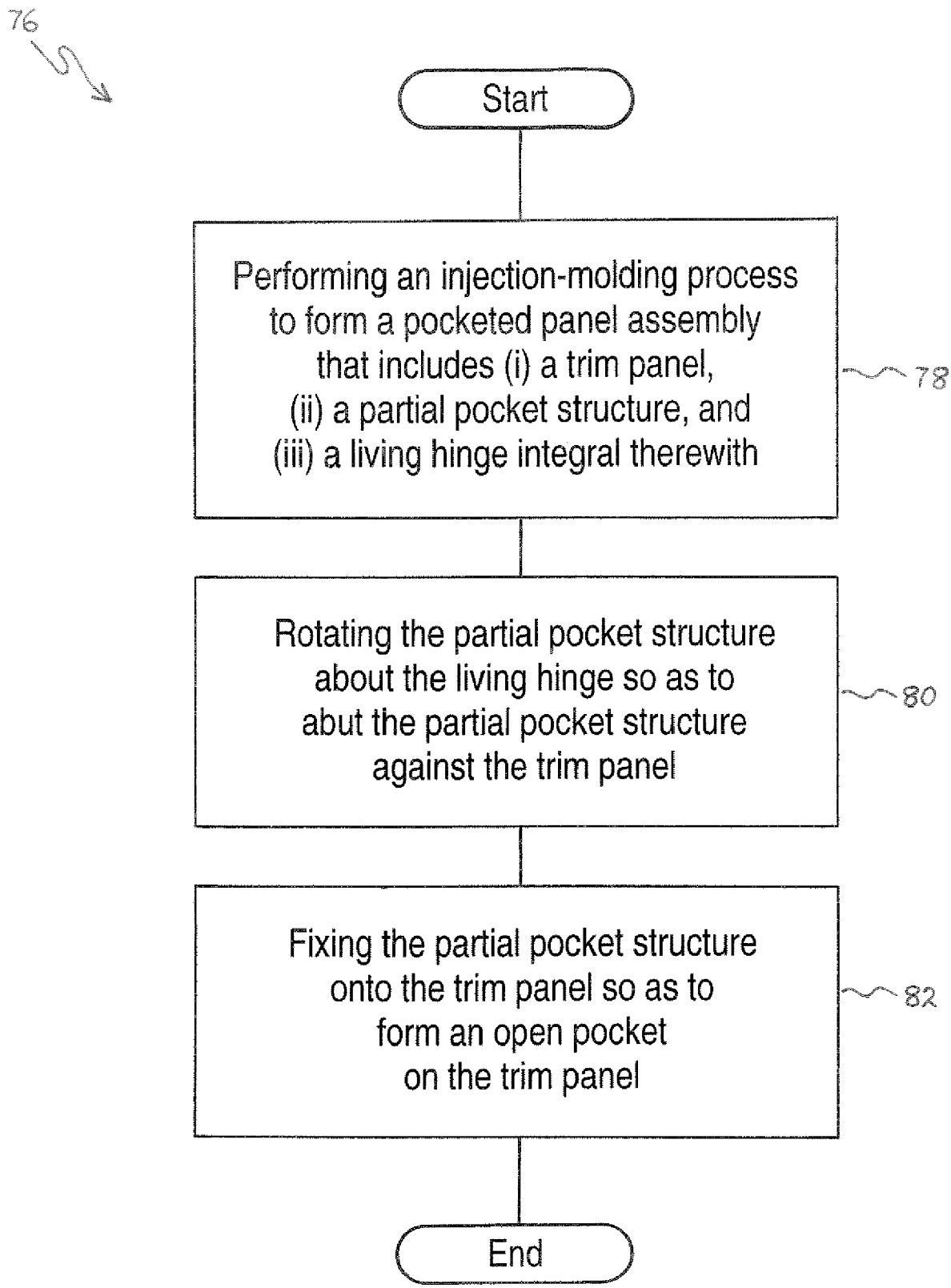
FIG. 5 illustrates a flow chart that sets forth steps in a method of assembling a pocketed panel for a vehicle door.

FIG. 5 illustrates a flow chart that summarily sets forth one practicable method 76 of assembling a pocketed panel for a vehicle door pursuant to the present invention. As illustrated in the flow chart, the method 76 basically includes the step 78 of performing an injection-molding process to create a pocketed panel assembly that includes (i) a trim panel having a pivotal edge, (ii) a partial pocket structure having a pivotal edge, and (iii) a living hinge integrally joining the pivotal edge of the trim panel to the pivotal edge of the partial pocket structure. Thereafter, the method 76 also includes the step 80 of rotating the partial pocket structure about the living hinge so as to substantially abut the partial pocket structure against the trim panel. Lastly, the method 76 further includes the step 82 of fixing the partial pocket structure onto the trim panel so as to form an open pocket on the trim panel.

In summary, some of the advantages realized in fabricating a pocketed panel assembly pursuant to the present invention are as follows. First, by fabricating a pocketed panel assembly pursuant to the present invention, a map pocket integral with a trim panel on the inboard side of a vehicle door can generally be manufactured with only a single plastic-injection mold. That is, separate molds for a map pocket's front portion and back portion are no longer necessary. Second, by fabricating a pocketed panel assembly pursuant to the present invention, few to no sonic welds are necessary to create a map pocket since the front portion and the back portion of the pocketed panel assembly pursuant to the present invention are integrally joined with a living hinge and may also be fixed together with a tabs-and-slots fixing means. Third, by fabricating a pocketed panel assembly pursuant to the present invention, a map pocket with one or more various feature inserts (for example, a carpet insert) retained therein may successfully be created via an insert-molding process. Furthermore, it is believed that various additional advantages of the present invention will become apparent to those skilled in the art as well.

While the present invention has been described in what are presently considered to be its most practical and preferred embodiments or methodologies, it is to be understood that the invention is not to be limited to the particular embodiments and methodologies disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures or methodologies as are permitted under the law.

What is claimed is:

1. A pocketed panel assembly for a vehicle door, said pocketed panel assembly comprising:
    a trim panel having a pivotal edge;
    a partial pocket structure having a pivotal edge; and
    a living hinge integrally joining said pivotal edge of said trim panel to said pivotal edge of said partial pocket structure;
    whereby said partial pocket structure can be rotated about said living hinge and substantially abutted against said trim panel so as to form an open pocket on said trim panel;
    wherein said partial pocket structure has a designated front side that retains a feature insert; and
    wherein said feature insert includes carpet.

2. A pocketed panel assembly according to claim 1, wherein said trim panel has a designated front side that is structurally adapted for forming said open pocket thereon, and said trim panel has a designated back side that is structurally adapted for being mounted on said vehicle door.

3. A pocketed panel assembly according to claim 1, wherein each of said trim panel, said partial pocket structure, and said living hinge comprises a plastic material selected from the group consisting of polypropylene, a thermoplastic elastomer, a thermoplastic olefin, a thermoplastic polyolefin, and acrylonitrile butadiene styreneplastic.

4. A pocketed panel assembly according to claim 1, wherein said trim panel has a designated bottom edge, and said pivotal edge of said trim panel is located at said designated bottom edge.

5. A pocketed panel assembly according to claim 1, wherein said partial pocket structure has a designated front side that is structurally adapted for accomodating an add-on feature.

6. A pocketed panel assembly according to claim 1, wherein said partial pocket structure has a designated bottom side, and said pivotal edge of said partial pocket structure is located on said designated bottom side.

7. A pocketed panel assembly according to claim 1, wherein said living hinge is particularly a composite living hinge that comprises a plurality of complementary living hinges.

8. A method of assembling a pocketed panel for a vehicle door, said method comprising the steps of:
- (a) performing an injection-molding process to form a pocketed panel assembly that includes (i) a trim panel having a pivotal edge, (ii) a partial pocket structure having a pivotal edge, and (iii) a living hinge integrally joining said pivotal edge of said trim panel to said pivotal edge of said partial pocket structure;
- (b) rotating said partial pocket structure about said living hinge so as to substantially abut said partial pocket structure against said trim panel;
- (c) fixing said partial pocket structure onto said trim panel so as to form an open pocket on said trim panel; and wherein said partial pocket structure has a designated front side, and step
- (a) includes the sub-step of performing an insert-molding process so as to retain a feature insert on said designated front side of said partial pocket structure.

9. A method of assembling a pocketed panel according to claim 8, wherein step (a) includes the sub-steps of forming a plurality of tabs on said partial pocket structure and also defining a matching plurality of slots in said trim panel, and step (c) includes the sub-step of inserting said tabs into said slots so as to capture said tabs therein.

10. A method of assembling a pocketed panel according to claim 8, wherein step (c) is accomplished by means of at least one fastener selected from the group consisting of a sonic weld, a heat stake, and glue.

* * * * *